United States Patent
Konishi

(10) Patent No.: US 9,832,364 B2
(45) Date of Patent: Nov. 28, 2017

(54) AUTOMATIC FOCAL ADJUSTMENT APPARATUS AND METHOD OF CONTROLLING AUTOMATIC FOCAL ADJUSTMENT APPARATUS, AND IMAGE CAPTURE APPARATUS

(71) Applicant: CANON KABUSHIKI KAISHA, Tokyo (JP)

(72) Inventor: Kazuki Konishi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/288,158

(22) Filed: Oct. 7, 2016

(65) Prior Publication Data

US 2017/0104919 A1 Apr. 13, 2017

(30) Foreign Application Priority Data

Oct. 9, 2015 (JP) .................... 2015-201542

(51) Int. Cl.
*H04N 5/232* (2006.01)

(52) U.S. Cl.
CPC .............. *H04N 5/23212* (2013.01)

(58) Field of Classification Search
CPC ............ H04N 5/3696; H04N 5/23212
See application file for complete search history.

(56) References Cited

U.S. PATENT DOCUMENTS

| 2005/0271373 A1* | 12/2005 | Tomita ............... H04N 5/23212 396/103 |
| 2016/0073007 A1* | 3/2016 | Konishi ............. H04N 5/23212 348/349 |
| 2016/0080636 A1* | 3/2016 | Konishi ............. H04N 5/23219 348/349 |

FOREIGN PATENT DOCUMENTS

| JP | 2011-253193 A | 12/2011 |
| JP | 2014-021373 A | 2/2014 |

* cited by examiner

*Primary Examiner* — Tuan Ho

(74) *Attorney, Agent, or Firm* — Carter, DeLuca, Farrell, Schmidt, LLP

(57) ABSTRACT

An automatic focal adjustment apparatus capable of focusing at a distance appropriate for an object at infinity, and a method of controlling the automatic focal adjustment apparatus, are disclosed. The automatic focal adjustment apparatus detects an in-focus position of a focus lens based on an AF evaluation value generated from an image signal. Also, the automatic focal adjustment apparatus moves the focus lens to the detected in-focus position when the detected in-focus position is within a predetermined range from a reference position determined in advance corresponding to an object at a infinity distance.

15 Claims, 11 Drawing Sheets

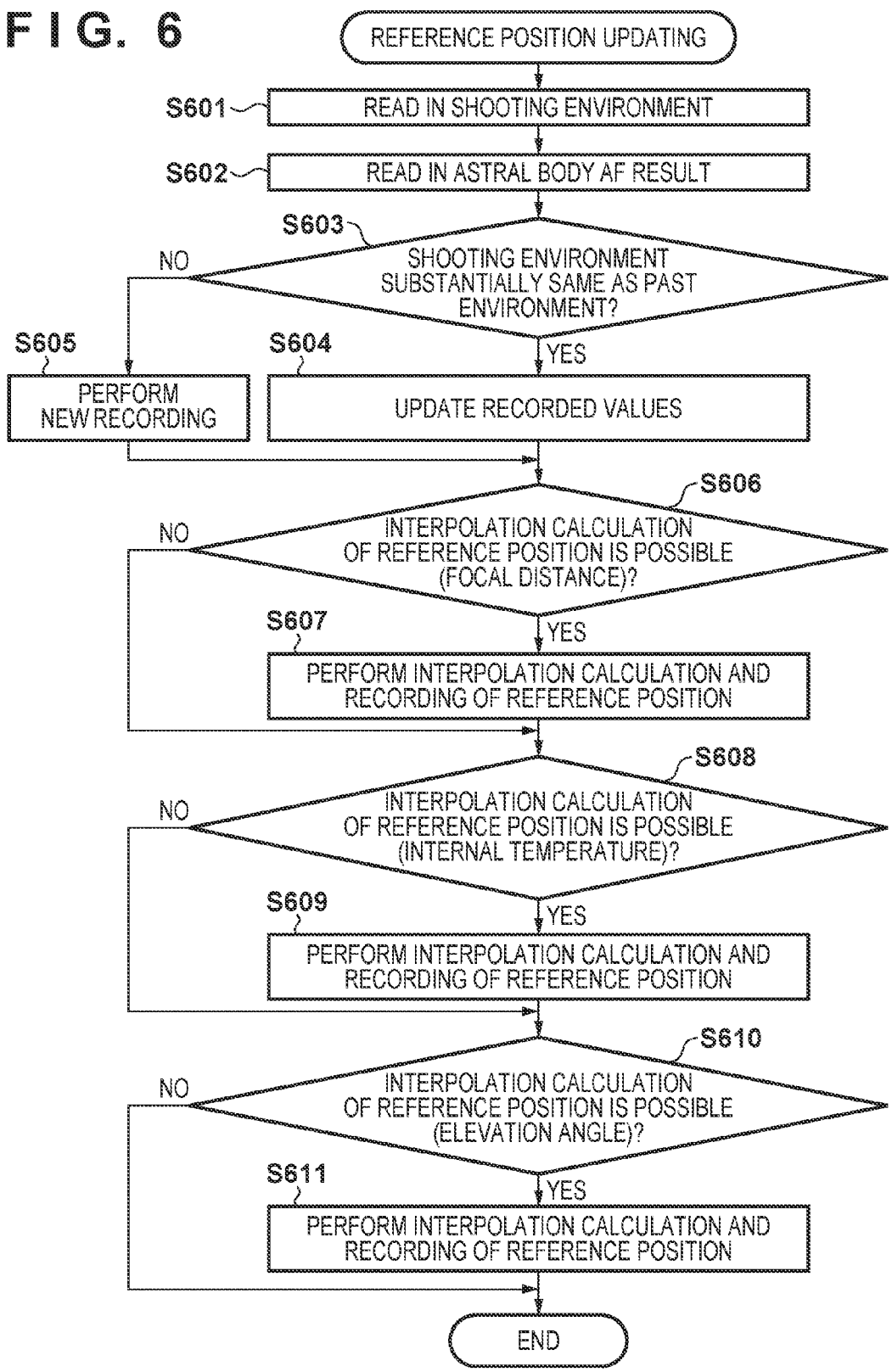

REFERENCE POSITIONS AT THE TIME OF MANUFACTURING

| Index | FOCAL DISTANCE | INTERNAL TEMPERATURE | ELEVATION ANGLE | REFERENCE POSITION |
|---|---|---|---|---|
| 1 | Wide | NORMAL TEMPERATURE(20°C) | 0° | xxx |
| 2 | Middle1 | NORMAL TEMPERATURE(20°C) | 0° | xxx |
| 3 | Middle2 | NORMAL TEMPERATURE(20°C) | 0° | xxx |
| 4 | Middle3 | NORMAL TEMPERATURE(20°C) | 0° | xxx |
| 5 | Middle4 | NORMAL TEMPERATURE(20°C) | 0° | xxx |
| 6 | Tele | NORMAL TEMPERATURE(20°C) | 0° | xxx |

FIG. 7A

RECORDED/UPDATED IN-FOCUS POSITIONS

| Index | FOCAL DISTANCE | INTERNAL TEMPERATURE | ELEVATION ANGLE | IN-FOCUS POSITION | RECORDING UPDATE TIME |
|---|---|---|---|---|---|
| 1 | Wide | 10°C | 45° | xxx | yyyy/mm/dd/h/m |
| 2 | Middle3 | 20°C | 45° | xxx | yyyy/mm/dd/h/m |
| 3 | Wide | 20°C | 60° | xxx | yyyy/mm/dd/h/m |
| 4 | Middle | 30°C | 45° | xxx | yyyy/mm/dd/h/m |
| 5 | .. | .. | .. | .. | .. |
| 6 | .. | .. | .. | .. | .. |
| 7 | .. | .. | .. | .. | .. |
| 8 | .. | .. | .. | .. | .. |
| 9 | .. | .. | .. | .. | .. |
| 10 | .. | .. | .. | .. | .. |
| 11 | .. | .. | .. | .. | .. |
| ..... | | | | | |

UPDATED REFERENCE POSITIONS

| Index | FOCAL DISTANCE | INTERNAL TEMPERATURE | ELEVATION ANGLE | REFERENCE POSITION | RECORDING UPDATE TIME |
|---|---|---|---|---|---|
| 1 | Wide | 20°C | 45° | xxx | yyyy/mm/dd/h/m |
| 2 | Middle1 | 20°C | 45° | xxx | yyyy/mm/dd/h/m |
| 3 | Middle2 | 20°C | 45° | xxx | yyyy/mm/dd/h/m |
| 4 | Middle3 | 20°C | 45° | xxx | yyyy/mm/dd/h/m |
| 5 | Middle4 | 20°C | 45° | xxx | yyyy/mm/dd/h/m |
| 6 | Tele | 20°C | 45° | xxx | yyyy/mm/dd/h/m |
| 7 | Wide | 10°C | 45° | xxx | yyyy/mm/dd/h/m |
| 8 | Middle1 | 10°C | 45° | xxx | yyyy/mm/dd/h/m |
| 9 | Middle2 | 10°C | 45° | xxx | yyyy/mm/dd/h/m |
| 10 | Middle3 | 10°C | 45° | xxx | yyyy/mm/dd/h/m |
| 11 | Middle4 | 10°C | 45° | xxx | yyyy/mm/dd/h/m |
| 12 | Tele | 10°C | 45° | xxx | yyyy/mm/dd/h/m |
| 13 | Wide | 15°C | 45° | xxx | yyyy/mm/dd/h/m |
| 14 | Middle1 | 15°C | 45° | xxx | yyyy/mm/dd/h/m |
| 15 | Middle2 | 15°C | 45° | xxx | yyyy/mm/dd/h/m |
| 16 | Middle3 | 15°C | 45° | xxx | yyyy/mm/dd/h/m |
| 17 | Middle4 | 15°C | 45° | xxx | yyyy/mm/dd/h/m |
| 18 | Tele | 15°C | 45° | xxx | yyyy/mm/dd/h/m |
| 19 | Wide | 20°C | 75° | xxx | yyyy/mm/dd/h/m |
| 20 | Middle1 | 20°C | 75° | xxx | yyyy/mm/dd/h/m |
| 21 | Middle2 | 20°C | 75° | xxx | yyyy/mm/dd/h/m |
| 22 | Middle3 | 20°C | 75° | xxx | yyyy/mm/dd/h/m |
| 23 | Middle4 | 20°C | 75° | xxx | yyyy/mm/dd/h/m |
| 24 | Tele | 20°C | 75° | xxx | yyyy/mm/dd/h/m |
| 25 | Wide | 20°C | 60° | xxx | yyyy/mm/dd/h/m |
| 26 | Middle1 | 20°C | 60° | xxx | yyyy/mm/dd/h/m |
| 27 | Middle2 | 20°C | 60° | xxx | yyyy/mm/dd/h/m |
| 28 | Middle3 | 20°C | 60° | xxx | yyyy/mm/dd/h/m |
| 29 | Middle4 | 20°C | 60° | xxx | yyyy/mm/dd/h/m |
| 30 | Tele | 20°C | 60° | xxx | yyyy/mm/dd/h/m |
| ... | Wide | ...°C | ...° | xxx | · · |
| ... | Middle1 | ...°C | ...° | xxx | · · |
| ... | Middle2 | ...°C | ...° | xxx | · · |
| ... | Middle3 | ...°C | ...° | xxx | · · |
| ... | Middle4 | ...°C | ...° | xxx | · · |
| ... | Tele | ...°C | ...° | xxx | · · |

FIG. 9A

CORRECTION AMOUNTS OF IN-FOCUS POSITION AT THE TIME OF MANUFACTURING
(APERTURE SET TO OPEN APERTURE VALUE OF EACH FOCAL DISTANCE)

| Index | FOCAL DISTANCE | FOCUS LENS POSITION | FOCUS CORRECTION AMOUNT |
|---|---|---|---|
| 1 | Wide | POINT-BLANK DISTANCE | xxx |
| 2 | Middle1 | POINT-BLANK DISTANCE | xxx |
| 3 | Middle2 | POINT-BLANK DISTANCE | xxx |
| 4 | Middle3 | POINT-BLANK DISTANCE | xxx |
| 5 | Middle4 | POINT-BLANK DISTANCE | xxx |
| 6 | Tele | POINT-BLANK DISTANCE | xxx |
| 7 | Wide | CLOSE DISTANCE | xxx |
| 8 | Middle1 | CLOSE DISTANCE | xxx |
| 9 | Middle2 | CLOSE DISTANCE | xxx |
| 10 | Middle3 | CLOSE DISTANCE | xxx |
| 11 | Middle4 | CLOSE DISTANCE | xxx |
| 12 | Tele | CLOSE DISTANCE | xxx |
| 13 | Wide | MIDDLE DISTANCE | xxx |
| 14 | Middle1 | MIDDLE DISTANCE | xxx |
| 15 | Middle2 | MIDDLE DISTANCE | xxx |
| 16 | Middle3 | MIDDLE DISTANCE | xxx |
| 17 | Middle4 | MIDDLE DISTANCE | xxx |
| 18 | Tele | MIDDLE DISTANCE | xxx |
| 19 | Wide | INFINITY | xxx |
| 20 | Middle1 | INFINITY | xxx |
| 21 | Middle2 | INFINITY | xxx |
| 22 | Middle3 | INFINITY | xxx |
| 23 | Middle4 | INFINITY | xxx |
| 24 | Tele | INFINITY | xxx |

FIG. 9B

RECORDED/UPDATED FOCUS CORRECTION AMOUNTS

| Index | FOCAL DISTANCE | FOCUS LENS POSITION | FOCUS CORRECTION AMOUNT |
|---|---|---|---|
| 1 | Wide | INFINITY | xxx |
| 2 | Middle3 | INFINITY | xxx |
| 3 | Tele | INFINITY | xxx |
| 4 | Middle1 | INFINITY | xxx |
| 5 | .. | .. | xxx |
| 6 | .. | .. | xxx |
| 7 | .. | .. | xxx |
| 8 | .. | .. | xxx |
| 9 | .. | .. | xxx |
| 10 | .. | .. | xxx |
| 11 | .. | .. | xxx |
| .. | | | |
| .. | | | |
| .. | | | |
| .. | | | |
| .. | | | |

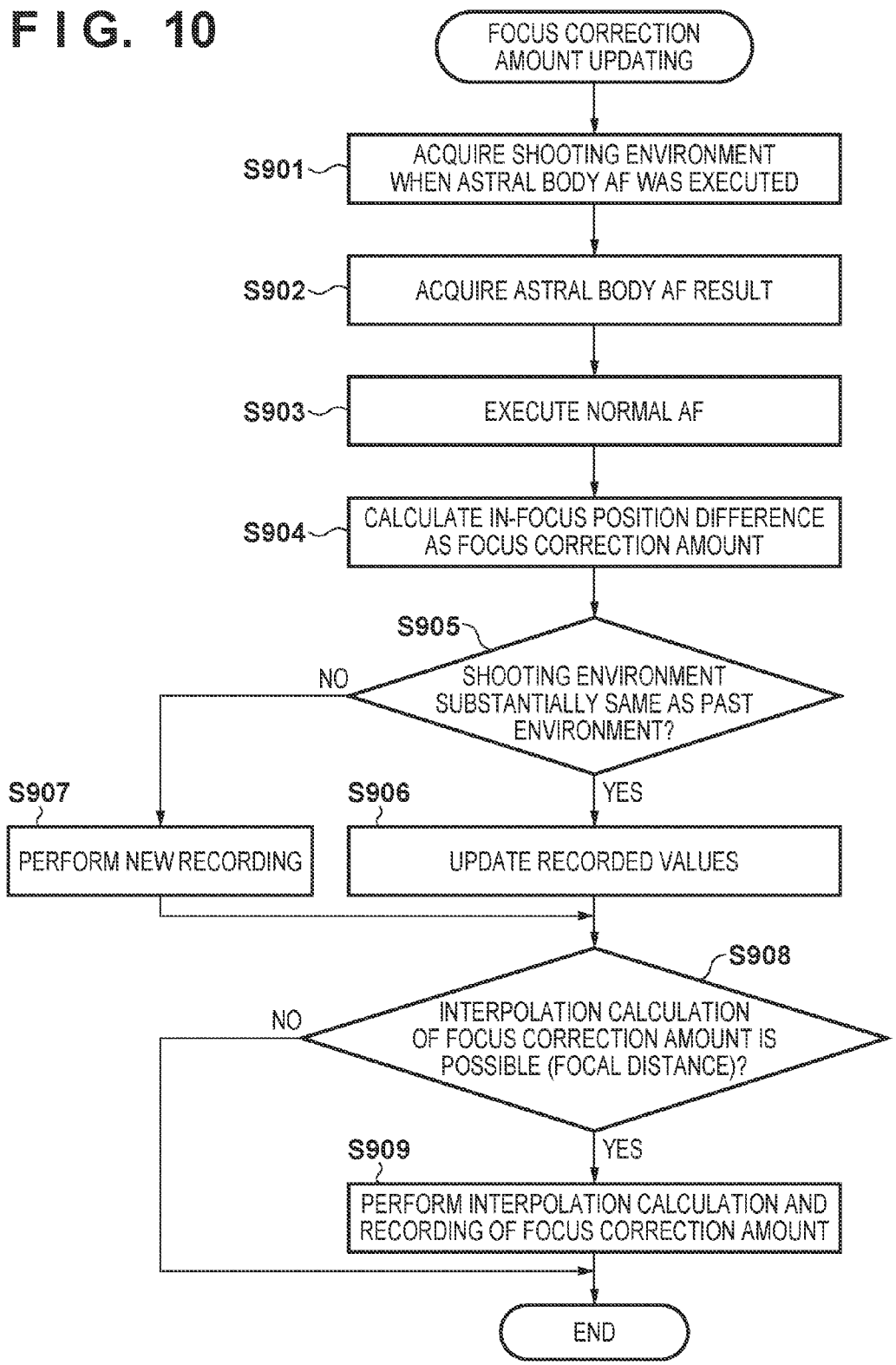

AUTOMATIC FOCAL ADJUSTMENT APPARATUS AND METHOD OF CONTROLLING AUTOMATIC FOCAL ADJUSTMENT APPARATUS, AND IMAGE CAPTURE APPARATUS

BACKGROUND OF THE INVENTION

Field of the Invention

The present invention relates to an automatic focal adjustment apparatus and a method of controlling the automatic focal adjustment apparatus, and an image capture apparatus.

Description of the Related Art

Conventionally, as a configuration for appropriately performing automatic focal adjustment (AF) for an object at infinity, Japanese Patent Laid-Open No. 2014-21373 discloses a configuration in which, in a case where an object at infinity was detected based on an image feature amount (for example, luminance), a focus lens is driven in a direction that focuses at infinity.

In Japanese Patent Laid-Open No. 2014-21373, when an object at infinity is detected, the focus lens is driven in the direction that focuses at infinity, but there is no determination of whether or not focus was achieved at the distance corresponding to the object at infinity. Therefore, focus is not necessarily actually achieved on the object at infinity.

SUMMARY OF THE INVENTION

The present invention was made in consideration of such problems in the conventional technology, and provides an automatic focal adjustment apparatus capable of focusing at a distance appropriate for an object at infinity, and a method of controlling the automatic focal adjustment apparatus, and an image capture apparatus.

According to an aspect of the present invention, there is provided an automatic focal adjustment apparatus, comprising: a generating unit configured to generate an AF evaluation value from an image signal; a detecting unit configured to detect an in-focus position of a focus lens based on the AF evaluation value; and a control unit configured to move the focus lens to the detected in-focus position when the detected in-focus position is within a predetermined range from a reference position that is determined in advance corresponding to an object at an infinity distance, and move the focus lens to a predetermined position when the detected in-focus position is not within the predetermined range from the reference position, wherein the predetermined position is the reference position, or is an in-focus position within the predetermined range from the reference position from among in-focus positions detected in the past by the detecting unit.

According to another aspect of the present invention, there is provided an image capture apparatus, comprising: an image sensor; a circuit that generates an image signal from the image sensor; and an automatic focal adjustment apparatus, wherein the automatic focal adjustment apparatus comprising: a generating unit configured to generate an AF evaluation value from an image signal; a detecting unit configured to detect an in-focus position of a focus lens based on the AF evaluation value; and a control unit configured to move the focus lens to the detected in-focus position when the detected in-focus position is within a predetermined range from a reference position that is determined in advance corresponding to an object at an infinity distance, and move the focus lens to a predetermined position when the detected in-focus position is not within the predetermined range from the reference position, wherein the predetermined position is the reference position, or is an in-focus position within the predetermined range from the reference position from among in-focus positions detected in the past by the detecting unit.

According to a further aspect of the present invention, there is provided a method of controlling an automatic focal adjustment apparatus, comprising: generating an AF evaluation value from an image signal; detecting an in-focus position of a focus lens based on the AF evaluation value; moving the focus lens to the detected in-focus position when the detected in-focus position is within a predetermined range from a reference position that is determined in advance corresponding to an object at a infinity distance; and moving the focus lens to a predetermined position when the detected in-focus position is not within the predetermined range from the reference position, wherein the predetermined position is the reference position, or is an in-focus position within the predetermined range from the reference position from among in-focus positions detected in the past by the detecting unit.

According to another aspect of the present invention, there is provided a non-transitory computer-readable storage medium storing a computer program for causing a computer provided in an automatic focal adjustment apparatus to function as: a generating unit configured to generate an AF evaluation value from an image signal; a detecting unit configured to detect an in-focus position of a focus lens based on the AF evaluation value; and a control unit configured to move the focus lens to the detected in-focus position when the detected in-focus position is within a predetermined range from a reference position that is determined in advance corresponding to an object at an infinity distance, and move the focus lens to a predetermined position when the detected in-focus position is not within the predetermined range from the reference position, wherein the predetermined position is the reference position, or is an in-focus position within the predetermined range from the reference position from among in-focus positions detected in the past by the detecting unit.

Further features of the present invention will become apparent from the following description of exemplary embodiments with reference to the attached drawings.

BRIEF DESCRIPTION OF THE DRAWINGS

FIG. 6 is a flowchart related to processing to update a reference position according to the first embodiment.

FIGS. 7A and 7B show an exemplary recording format of reference positions and in-focus positions according to the first embodiment.

FIG. 8 shows an exemplary recording format of updated reference positions according to the first embodiment.

FIGS. 9A and 9B show an exemplary recording format of focus correction amounts according to the first embodiment.

FIG. 10 is a flowchart related to processing to update a focus correction amount in the first embodiment.

DESCRIPTION OF THE EMBODIMENTS

Exempraly embodiments of the present invention will now be described in detail in accordance with the accompanying drawings. Note that below, an embodiment is described in which the automatic focal adjustment apparatus and the method of controlling the automatic focal adjustment apparatus according to the present invention are applied to a digital camera serving as an example of an image capture apparatus. However, the present invention is also applicable to an arbitrary electronic device provided with an automatic focal adjustment (AF) function having an operation mode targeted at an object positioned at infinity and having low illuminance or low luminance, or a shooting mode for shooting such an object.

First Embodiment

Figure 1:
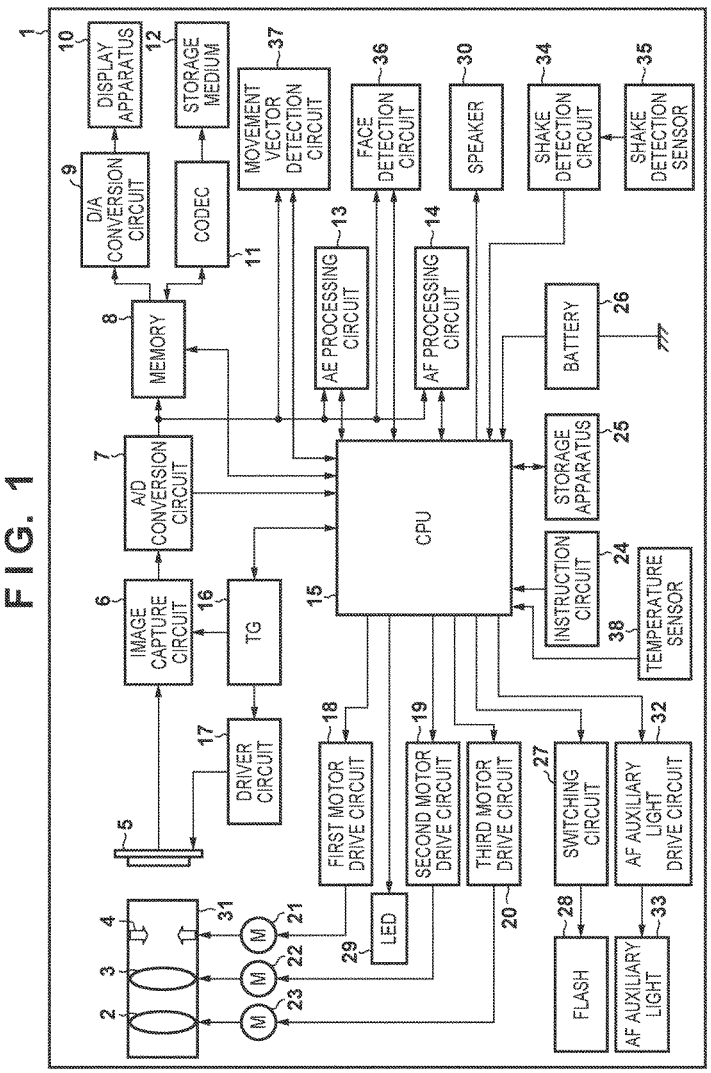
FIG. 1 is a block diagram showing an exemplary functional configuration of a digital camera employing an automatic focal adjustment apparatus according to an embodiment.

FIG. 1 is a block diagram showing an exemplary functional configuration of a digital camera 1 according to a first embodiment of the present invention. An imaging optical system 31 has a zoom (variable power) lens 2, a focus lens 3, and an aperture 4. The aperture 4 may also serve as a mechanical shutter. In order to simplify the drawing, the zoom lens 2 and the focus lens 3 are shown as a single lens. However, each of the zoom lens 2 and the focus lens 3 can actually be comprised of a plurality of lenses. An image sensor 5 is a CCD image sensor or a CMOS image sensor with pixels arranged in two dimensions, and having a photoelectric conversion function. An image capture circuit 6 performs various image processing on an electrical signal generated by the image sensor 5, and generates an analog image signal. The analog image signal is converted to a digital image signal (image data) by an A/D conversion circuit 7, and stored in a memory 8.

A D/A conversion circuit 9 converts the image data stored in the memory 8 to an analog image signal, and performs conversion to an image signal in a form suitable for playback output. The image signal output by the D/A conversion circuit 9 is displayed by a display apparatus 10, which is a liquid crystal display apparatus (LCD), for example.

A codec 11 encodes the image data stored in the memory 8 according to a recording format, and decodes encoded image data. A storage medium 12 is a memory card, for example, and stores encoded image data.

An AE processing circuit 13 generates an evaluation value for automatic exposure (AE) processing based on output of the A/D conversion circuit 7, and outputs the generated evaluation value to a CPU 15. The CPU 15 determines exposure conditions such as a shutter speed, an aperture value (F value), a shooting sensitivity, and the like based on the AE evaluation value. An AF processing circuit 14 generates an AF evaluation value based on the output of the A/D conversion circuit 7. The CPU 15, which is a control apparatus, realizes functions of the digital camera 1 by executing a program stored in a storage apparatus 25. The CPU 15 detects an in-focus position of the focus lens 3 based on the AF evaluation value. Also, in a case where an operation mode for shooting a specific object has been set in the digital camera 1, the CPU 15 determines whether or not the detected in-focus position is reliable as an in-focus position for the specific object that is the target of the operation mode. Also, if determined that the detected in-focus position is reliable, the CPU 15 moves the focus lens 3 to the detected in-focus position.

A timing generator (TG) 16 generates a predetermined timing signal from a reference clock signal, and the CPU 15 supplies this timing signal to the image capture circuit 6 and a driver circuit 17. The driver circuit 17 drives the image sensor 5. An aperture drive motor 21 drives the aperture 4 according to control of a first motor drive circuit 18. A focus drive motor 22 drives the focus lens 3 according to control of a second motor drive circuit 19. A zoom drive motor 23 drives the zoom lens 2 according to control of a third motor drive circuit 20.

An instruction circuit 24 is a circuit for a user to input an instruction to the digital camera 1. Representative configurations included in the instruction circuit 24 include a power switch, a release button, a mode dial, a zoom lever, a direction key, a determination key, a menu button, a touch panel, and the like, but the instruction circuit 24 is not limited to including these. Note that in the present embodiment, the release button is configured with a two-stage switch that issues an instruction to start AE processing and AF processing by a half-press, and issues an instruction to start an operation to perform shooting for recording by a full press.

A storage apparatus 25 stores a program executed by the CPU 15, setting values, GUI data, audio data, and the like. The storage apparatus 25 can be an electrically rewritable memory, for example. A battery 26 is a power source of the digital camera 1. A flash 28 is an auxiliary light source that emits light according to control of a switching circuit 27. Light emission of an LED 29 is controlled by the CPU 15, and the LED 29 is used for a warning display or an operation status display. A speaker 30 outputs audio guidance, a warning sound, or the like.

An AF auxiliary light 33 is an auxiliary light source that emits light according to control of an AF auxiliary light drive circuit 32 when performing image capture for acquiring an AF evaluation value. A shake detection sensor 35 is an acceleration sensor, for example, and detects movement of the digital camera 1. A shake detection circuit 34 processes a signal of the shake detection sensor 35. A face detection circuit 36 detects the position, size, or the like of an area having features of a face of a person, included in a shot image, based on output of the A/D conversion circuit 7. A movement vector detection circuit 37 detects, from a plurality of images that were shot at different times, a movement vector with respect to all of an image and/or a partial area of an image. A temperature sensor 38 outputs a signal expressing an internal temperature of (a barrel of) the imaging optical system 31 to the CPU 15.

Operation of the digital camera 1 configured in this manner will now be described.

Light incident from an object to the imaging optical system 31 of the digital camera 1 forms an object image on a light-receiving face of the image sensor 5. The object image is photoelectrically converted in each of a plurality of pixels provided in the image sensor 5, and output as an analog electrical signal to the image capture circuit 6. In the image capture circuit 6, predetermined signal processing is performed on the analog electrical signal, and an analog image signal is generated. The analog image signal is converted to a digital image signal (image data) by the A/D conversion circuit 7, and then temporarily stored in the memory 8.

The image data that was stored in the memory 8 is converted to an analog image signal for display by the D/A conversion circuit 9, and displayed in the display apparatus 10. Also, the image data that was stored in the memory 8 is encoded according to a recording format by the codec 11, and then stored in the storage medium 12.

Also, when the digital camera 1 is operating in a playback mode, when there is an instruction to playback image data stored in the storage medium 12, the encoded image data is read out from the storage medium 12 and input to the codec 11. The codec 11 decodes the encoded image data and stores the decoded image data in the memory 8. The image data that was stored in the memory 8 is converted to an analog image signal for display by the D/A conversion circuit 9, and displayed in the display apparatus 10.

Image data output by the A/D conversion circuit 7 is also supplied to the AE processing circuit 13, the AF processing circuit 14, the face detection circuit 36, and the movement vector detection circuit 37. The AE processing circuit 13 calculates an AE evaluation value based on a luminance value of image data of one screen, for example, and outputs the calculated AE evaluation value to the CPU 15.

The AF processing circuit 14 extracts a high frequency component from image data corresponding to a focal detection area determined in advance, calculates an AF evaluation value corresponding to an edge component amount, and outputs the calculated AF evaluation value to the CPU 15. The quantity and position of the focal detection area can be determined according to settings, face detection results, and the like. In the AF processing circuit 14, properties of a high-pass filter (HPF) used in order to extract the high frequency component from the image data are variable, and it is possible to extract high frequency components for different frequency bands. The properties of the high-pass filter can be set according to the drive (read-out) mode of the image sensor 5.

The face detection circuit 36 searches in the image data for an area having parts that distinguish a face, such as eyes or eyebrows, and detects the position and the size of an area (a face area) considered to be the face of a person.

The movement vector detection circuit 37 performs a correlation operation to calculate a correlation with image data that was shot in the past, and detects a movement vector of an entire image, or a movement vector of an area that is moving within an image. Also, the image data is used to calculate a next movement vector, so the image data is saved.

A predetermined timing signal is output from the TG 16 to the CPU 15, the image capture circuit 6, and the driver circuit 17, and the CPU 15 synchronizes various control to this timing signal. Also, the image capture circuit 6 synchronizes image processing such as color signal separation to the timing signal from the TG 16. The driver circuit 17 synchronizes driving of the image sensor 5 to the timing signal of the TG 16.

By controlling each of the first to third motor drive circuits 18 to 20, the CPU 15 controls driving of the aperture 4, the focus lens 3, and the zoom lens 2 through the aperture drive motor 21, the focus drive motor 22, and the zoom drive motor 23. The CPU 15 determines exposure conditions such as an F value, a shutter speed, and a shooting sensitivity based on the AE evaluation value calculated by the AE processing circuit 13, and controls the first motor drive circuit 18 to drive the aperture drive motor 21, thereby controlling an opening amount of the aperture 4 and shutter operation. Also, the CPU 15 detects a position (referred to below as an in-focus position of the focus lens 3) of the focus lens 3 where the AF evaluation value calculated by the AF processing circuit 14 becomes a peak value. Then, the CPU 15 controls the second motor drive circuit 19 to drive the focus drive motor 22, thereby moving the focus lens 3 to the in-focus position. Also, in a case where a zoom instruction was input through the instruction circuit 24, the CPU 15 controls the third motor drive circuit 20 to drive the zoom motor 23, thereby moving the zoom lens 2 to change an angle of view (focal distance) of the imaging optical system.

Next, a shooting operation of the digital camera 1 will be described with reference to the flowchart shown in FIG. 2.

Note that in the following description, an operation to acquire AF evaluation values while changing the position of the focus lens 3 in predetermined intervals (scanning intervals) is called scanning. Also, one sequence of operation in which scanning is performed, an in-focus position of the focus lens 3 is detected based on the AF evaluation values obtained by scanning, and the focus lens 3 is moved to the in-focus position, is called scanning AF. Also, an acquired quantity of AF evaluation values is called a quantity of scanning points, a range where the focus lens 3 is driven in order to acquire AF evaluation values is called a scanning range, and an area where an image signal for detecting the in-focus position of the focus lens 3 is acquired is called an AF frame or a focal detection area. Note that these have a relationship of scanning range=scanning interval×(quantity of scanning points−1). Also, an object distance corresponding to the in-focus position of the focus lens 3 is called a focus distance (or a shooting distance) in the present specification.

Figure 2:
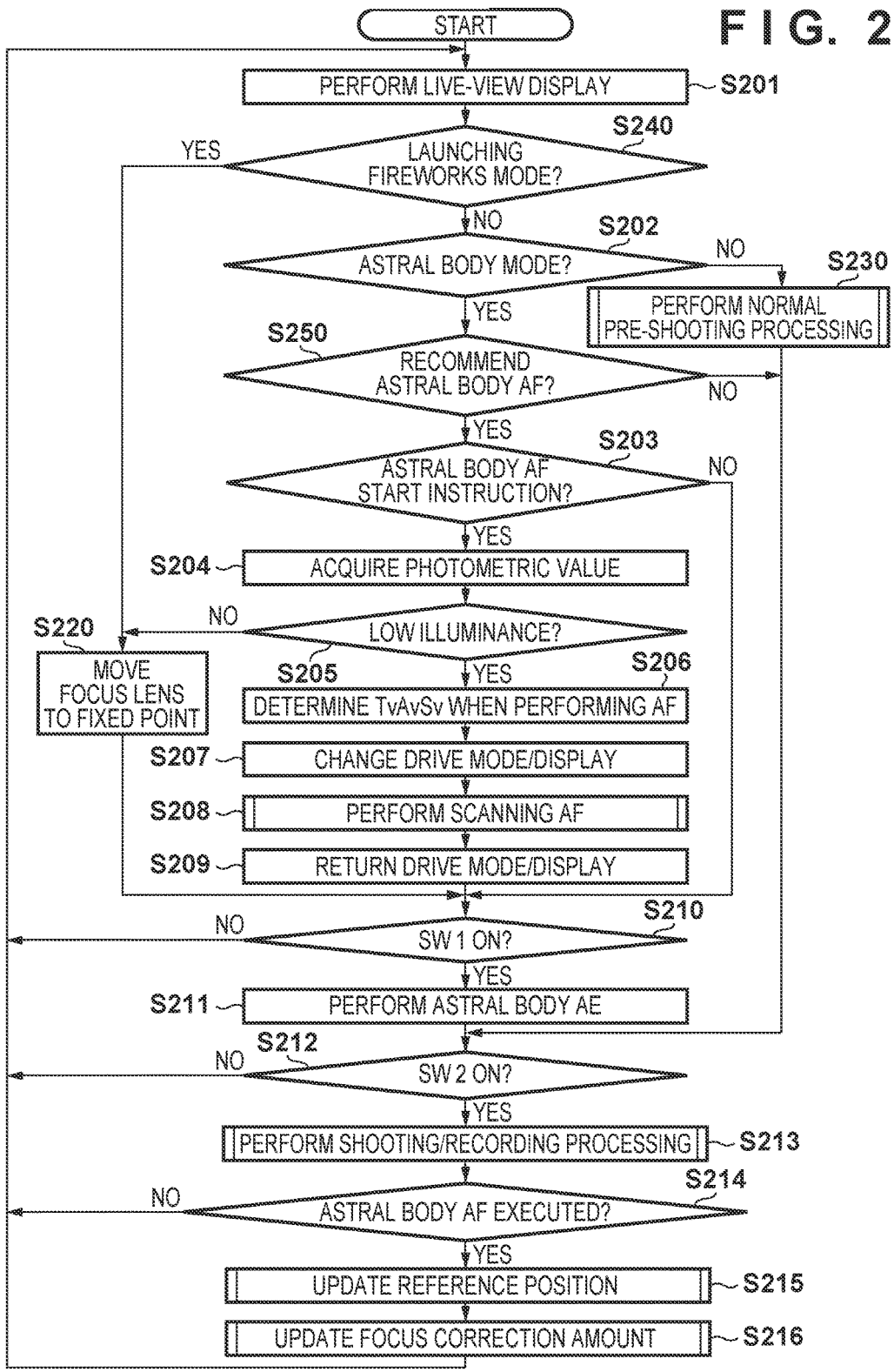
FIG. 2 is a flowchart related to an automatic focal adjustment operation of the digital camera according to an embodiment.

The digital camera 1 of the present embodiment, when a power switch is on and the operation mode is set to the shooting (image recording) mode, executes the shooting processing sequence shown in FIG. 2. Note that in the present embodiment, a case is described where a launching fireworks mode and an astral body mode (or a star nightscape mode) can be set as shooting modes for shooting an object positioned at infinity and having low illuminance or low luminance, but other modes may also be adopted.

First, in step S201 the CPU 15 performs live-view display processing. The live-view display processing is processing to perform moving image shooting, and immediately (in substantially real-time) display the obtained moving image in the display apparatus 10. Specifically, the CPU 15 controls each unit to execute the above-described processing to display a shot image with respect to each frame of the moving image.

Next, in step S240 the CPU 15 determines whether or not the launching fireworks mode is set as the shooting mode, and when determined that the launching fireworks mode is set, the CPU 15 advances processing to step S220, and when not determined that the launching fireworks mode is set, the CPU 15 advances processing to step S202.

In step S202, the CPU 15 determines whether or not the astral body mode is set as the shooting mode, and when determined that the astral body mode is set, the CPU 15 advances processing to step S250, and when not determined that the astral body mode is set, the CPU 15 advances processing to step S230.

In step S230, the CPU 15 performs normal pre-shooting processing. The normal pre-shooting processing can be similar to conventional pre-shooting processing. In the pre-shooting processing, the CPU 15 performs AE processing and AF processing in response to a half-press operation (SW 1 ON) of the release button described above, and determines whether or not a full-press operation (SW 2 ON) of the release button was detected in step S212. Note that if SW 1 ON is not detected, the CPU 15 returns to step S201 instead of advancing processing to step S212.

On the other hand, when determined that the astral body mode is set, in step S250 the CPU 15 determines whether or not to recommend implementing an astral body AF, and when determined to recommend implementing the astral body AF, the CPU 15 displays a message for giving notification of that recommendation in the display apparatus 10, and then advances processing to step S203. For example, if, in the past within a predetermined time period from the present, the astral body AF has been performed in the same environment as the present environment, or a reference position for the same environment has been updated, the CPU 15 advances processing to step S212 without recommending implementing the astral body AF. In the present embodiment, the environment related to the astral body AF is specified by a combination of three parameters of a focal distance of the imaging optical system 31, an internal temperature of the barrel of the imaging optical system 31, and an elevation angle of the digital camera 1, but these parameters are only one example, and other parameters may also be included, for example. Note that the reference position is a position of the focus lens 3 corresponding to a hyperfocal distance, that is, a shooting distance closest to where infinity enters the depth of field. If, in the past within a predetermined time period from the present, the astral body AF has not been performed in the same environment as the present, or the reference position for the same environment as the present has not been updated, the CPU 15 recommends implementing the astral body AF.

In step S203, the CPU 15 determines whether or not an instruction to start astral body AF processing has been input, and if determined that such an instruction has been input, the CPU 15 advances processing to step S204, and if determined that such an instruction has not been input, the CPU 15 advances processing to step S210. This start instruction can be an operation of a switch or a button included in the instruction circuit 24, for example.

In step S204, the CPU 15 acquires a photometric value for a particular shot image from shooting conditions (an accumulation time (shutter speed) of the image sensor 5, an amplification factor (shooting sensitivity) of the image capture circuit 6, and an F value of the aperture 4) and an output value of the AE processing circuit 13, and then advances processing to step S205.

In step S205, the CPU 15 determines whether or not the object has low illuminance from the acquired photometric value, and if determined that the object has low illuminance, the CPU 15 advances processing to step S206, and if determined that the object does not have low illuminance, the CPU 15 advances processing to step S220. This determination can be a determination of whether or not the photometric value is lower than a threshold value for low illuminance determination that has been determined in advance.

In step S220, the CPU 15 controls the second motor drive circuit 19 to move the focus lens 3 to a fixed point (a specific position). Here, the fixed point is a position of the focus lens 3 that corresponds to the hyperfocal distance, and for example, is registered in advance associated with the focal distance of the imaging optical system 31 in the storage apparatus 25. In the present specification, this fixed point is used as the reference position of the astral body AF. Note that the reference position of the astral body AF can be changed, as described later.

The processing of step S220 is executed in a case where the launching fireworks mode is set as the shooting mode (YES in step S240), and in a case where the object was determined to not have low illuminance in the astral body mode (NO in step S205).

In a case where processing was advanced from step S205 to step S220, execution of the astral body AF is inappropriate, so in step S220, the CPU 15 may also inform the user that the astral body AF failed by displaying a message or the like in the display apparatus 10. Also, the user may be informed that the reason for the failure was that the object is too bright (for example, due to the light of the moon or terrestrial lighting).

Note that in a case where the launching fireworks mode is set (a case where processing was advanced from step S240 to step S220), it is not necessary to give this sort of notification. After moving the focus lens 3 to the fixed point, the CPU 15 advances processing to step S210.

On the other hand, in a case where the object was determined to have low illuminance, in step S206, the CPU 15 determines shooting conditions when performing the scanning AF (a combination of the F value of the aperture 4, the accumulation time of the image sensor 5, and the amplification factor of the image capture circuit 6). The CPU 15, for example based on the shooting conditions that result in correct exposure for the photometric value acquired in step S204, determines a combination within a predetermined range, among combinations in which output decreases by a predetermined number of steps (for example, seven steps).

Here, the reason for adopting a combination in which output decreases by a predetermined number of steps from when there is correct exposure is that for an object having low illuminance, correct signal output obtained in a shot image differs from correct signal output in the scanning AF.

In a shot image, there may be no problem even if signals of images of stars of the first and second magnitude are saturated. This is because dark stars such as those of the third to sixth magnitude may become easier to be recognized in the shot image. Therefore, there may be cases where it is preferable to adopt shooting conditions such that the signals of the images of bright stars may be saturated. On the other hand, in the scanning AF, in a case where the signals of the images of bright stars are saturated, due to the properties of creation of an AF evaluation value with the AF processing circuit 14, the AF evaluation value becomes larger in a state where focus is somewhat blurred than that in a state where focus is not blurred (i.e., in-focus state), and therefore a correct in-focus position cannot be obtained. As a result, shooting conditions (shooting conditions with minus exposure compensation) are adopted such that lower output than when there is correct exposure is obtained, such that the signal of the image of a bright star is not saturated. Note that how many steps of minus exposure compensation to perform relative to shooting conditions corresponding to correct exposure can be set in advance.

Figure 3:
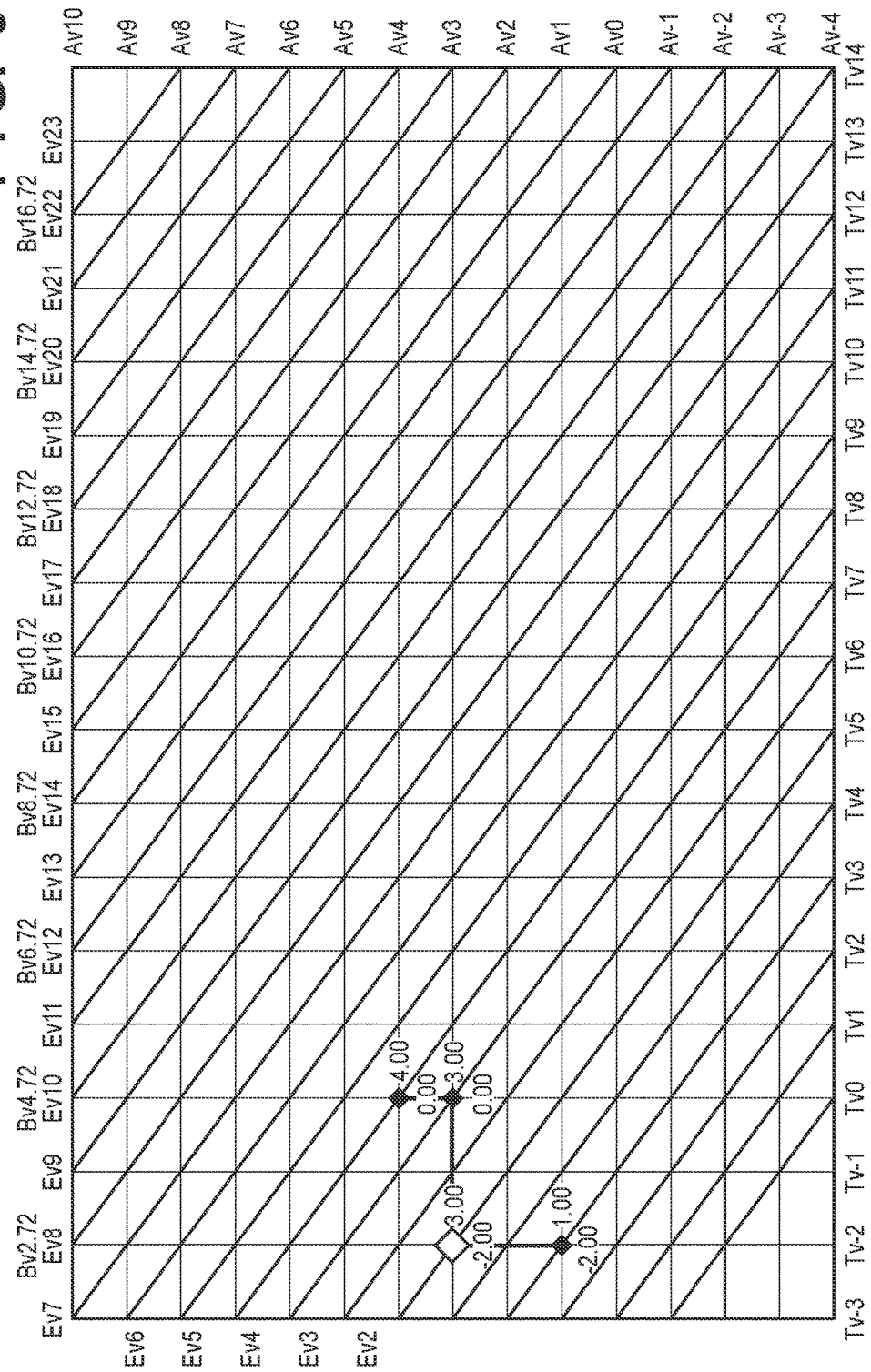
FIG. 3 shows an example of a program diagram according to a first embodiment.

FIG. 3 shows an example of a program diagram that can be used to determine shooting conditions when performing the scanning AF in the present embodiment. Note that this program diagram is only one example, and an appropriate program diagram can be used according to a condition such as an open F value of the imaging optical system 31.

A maximum value and a minimum value of each parameter in the program diagram can be determined presuming a typical astral body shooting scene. In the program diagram in FIG. 3, the F value has a maximum value of F2.8 (Av=3), the accumulation time has a maximum value of 1 second (Tv=0), and the amplification factor has a maximum value corresponding to ISO 100 (Sv=5), and these values are determined presuming a scene in which there are many first magnitude stars, second magnitude stars, and planets existing within the AF frame. Also, the F value has a minimum value of F2.8 (Av=3), the accumulation time has a minimum value of 4 seconds (Tv=−2), and the amplification factor has a maximum value corresponding to ISO 800 (Sv=8). These values are determined presuming a scene in which many first magnitude stars, second magnitude stars, and planets do not exist or are few within the AF frame, and in which also there are not many third to sixth magnitude stars. Note that the maximum and minimum values can be set through experimentation in advance.

The CPU 15 determines a combination of the F value, the accumulation time, and the amplification factor from the program diagram in FIG. 3 and a value obtained by subtracting the predetermined number of steps (here, 7 Ev) from the photometric value (Ev) acquired in step S204. Note that when the Ev value is outside of the range of the program diagram, the CPU 15 determines a combination of the maximum values or the minimum values of the program diagram as the shooting conditions.

When the shooting conditions used when performing the scanning AF in this way are determined, the CPU 15 advances processing to step S207, and changes the drive mode of the image sensor 5 and the display of the display apparatus 10 from a state used for live-view display to a state used for the astral body AF. Specifically, the CPU 15 changes the drive mode of the image sensor 5 from an addition read-out mode to a non-addition read-out mode, and changes the display content of the display apparatus 10 from a live-view image to a display informing that the astral body AF is presently being performed.

In the present embodiment, the accumulation time of the image sensor 5 when performing the astral body AF is at least one second, and an update cycle of the image displayed in the display apparatus 10 also is at least one second. Also, in the scanning AF, shooting is necessary at a plurality of scanning points, so the time needed for the AF increases. Therefore, the user is informed through a message display or the like that the astral body AF is being executed, so that the user does not mistakenly interfere with operation of the camera 1 during execution of the astral body AF. Note that in addition to a message, it is also possible to calculate the time needed for the astral body AF and display remaining time, or display elapsed time since starting the astral body AF.

Next, in step S208 the CPU 15 executes the scanning AF. Details of this scanning AF will be described with reference to FIGS. 4 and 5.

Figure 4:
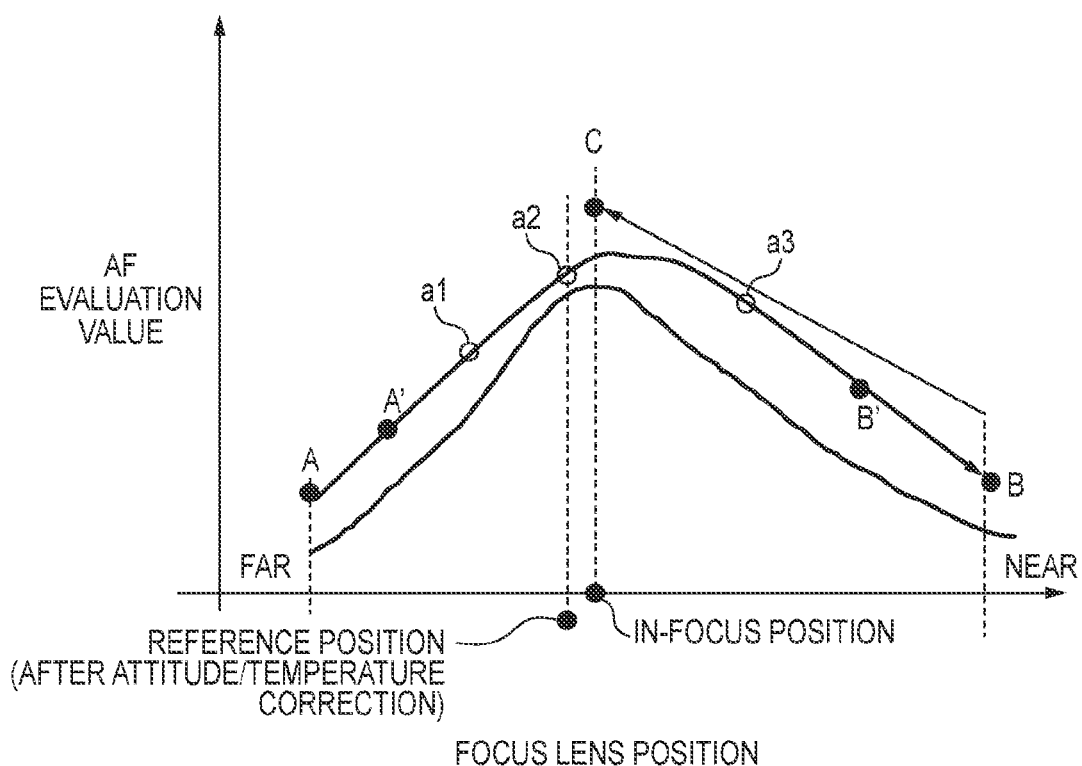
FIG. 4 is a schematic diagram of a scanning AF operation according to the first embodiment.

FIG. 4 schematically shows the relationship between the position of the focus lens 3 and AF evaluation values. The scanning AF in the astral body AF has a comparatively small scanning range centered on the above-described reference position (fixed point), and the starting point of the scanning range is indicated by letter A, the ending point of the scanning range is indicated by letter B, and the in-focus position that is searched for is indicated by letter C.

Figure 5:
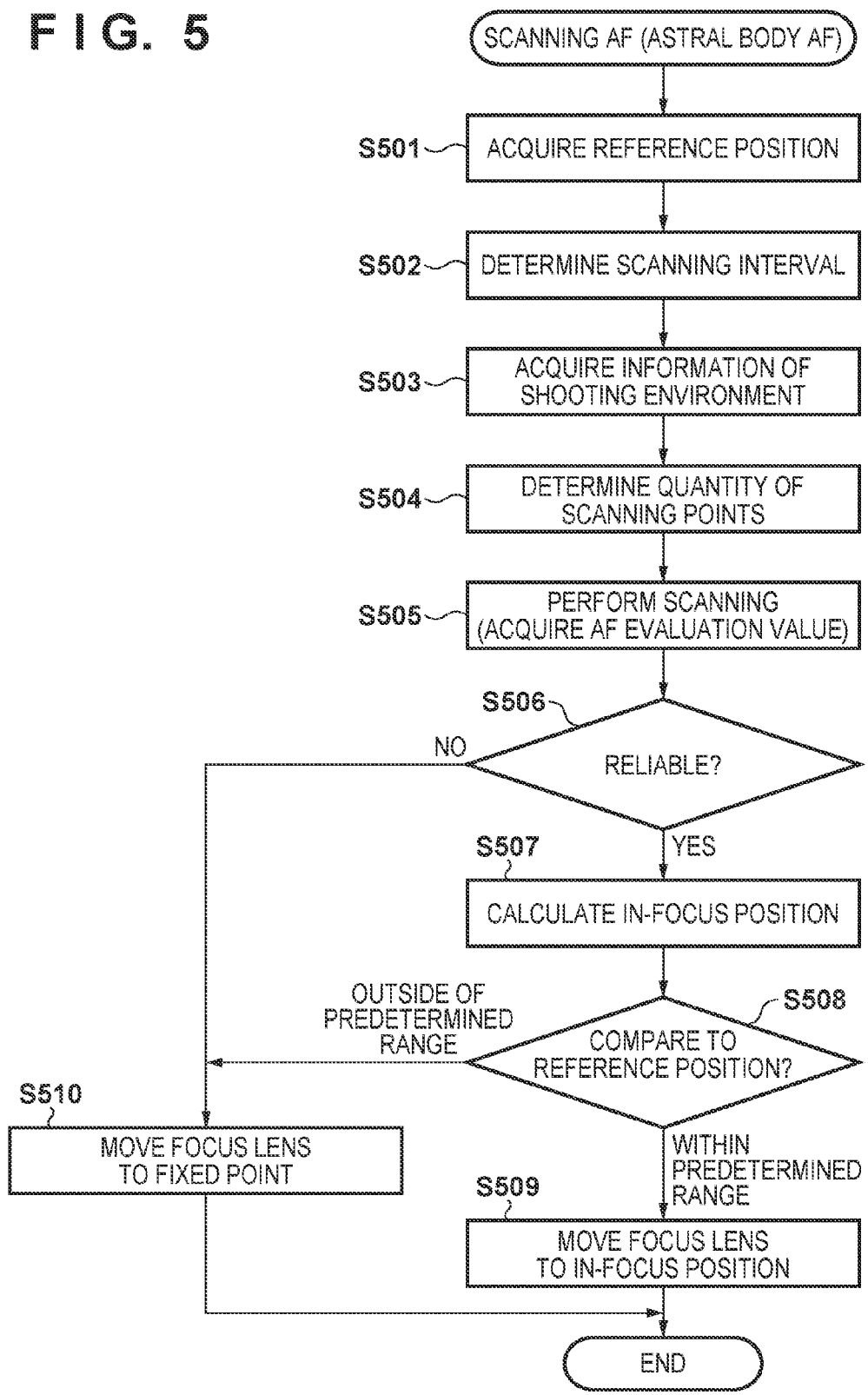
FIG. 5 is a flowchart related to scanning AF processing according to the first embodiment.

Specific operation will be described with reference to the flowchart in FIG. 5.

In step S501, the CPU 15, based on the present focal distance of the imaging optical system 31, refers to the storage apparatus 25 and acquires the reference position of the astral body AF.

Next, the CPU 15 determines a scanning interval (step S502). When the scanning interval is small, the accuracy of searching for the in-focus position improves, but the time needed for the AF increases because there are many scanning points, so a large scanning interval is set, within a range of permissible accuracy. For example, it is possible to use a value of approximately three to five times the focal depth at the open F value.

Next, the CPU 15 acquires information related to the shooting environment when the astral body AF was executed in the past, and information related to the shooting environment in the present (step S503). Here, as information related to the shooting environment, at least the internal temperature of the imaging optical system 31 and the attitude (elevation angle) of the digital camera 1 are used, and the focal distance of the imaging optical system 31 is further used as necessary. The internal temperature is acquired from the temperature sensor 38, the focal distance is acquired from the second motor drive circuit 19, and the angle is acquired from the shake detection sensor 35. The information related to the shooting environment is saved in the storage apparatus 25 together with the reference position.

Next, the CPU 15 determines a quantity of scanning points based on probability as infinity of the reference position (step S504). In a case where, such as at the time of product shipment, the astral body AF has not been executed even once, information related to the environment in which the reference position was measured at the time of manufacturing, and information related to the (present) environment when shooting, are used. Note that the reference position at the time of manufacturing is measured with the digital camera positioned horizontally (with an elevation angle of 0 degrees).

For example, in the case of a standard environment in which the elevation angle of the digital camera 1 is approximately 30 degrees ±15 degrees and the internal temperature is normal temperature, seven points is used as the quantity of scanning points in that environment. Also, in a case where the elevation angle is near horizontal (for example, less than approximately ±15 degrees), or in a case where it is possible to determine that the present internal temperature is substantially the same as the internal temperature when the reference position was measured at the time of manufacturing (for example, in a case where the difference is within 2° C.), the quantity of scanning points is reduced in comparison to the standard environment. On the other hand, in a case where the elevation angle is larger than in the standard environment (when shooting near a zenith), or in a case where the present internal temperature differs greatly from the internal temperature when the reference position was measured at the time of manufacturing (for example, in a case where the difference is 5° C. or more), the quantity of scanning points is increased in comparison to the standard environment. An increase or decrease in the quantity of scanning points corresponds to an expansion or contraction of the scanning range.

Also, in a case where the astral body AF has been executed in the past, the CPU 15 determines the quantity of scanning steps based on the shooting environment (the focal distance, the internal temperature, and the elevation angle) when the astral body AF was executed in the past and the present shooting environment. Specifically, the CPU 15, for example, refers to the results (in-focus positions) of the past astral body AF or updated reference positions saved in the storage apparatus 25, and the corresponding shooting environments, and checks whether or not the results were obtained in the same shooting environment as the present shooting environment, or in a shooting environment having little difference from the present shooting environment.

There are cases where only the results of executing the astral body AF (only the in-focus positions) are saved, and cases where reference positions that were updated by interpolating the results of the astral body AF are included.

Consequently, if a result of the astral body AF that was executed in substantially the same shooting environment as the present environment has been saved, the CPU 15 uses that result (in-focus position) as the reference position.

If there is not a result of the astral body AF that was executed in substantially the same shooting environment as the present environment, the CPU 15, from among reference positions that were updated by interpolation, adopts a reference position corresponding to a shooting environment that is substantially the same or has little difference from the present environment.

If there is not a reference position corresponding to any of the above cases, the CPU 15, for a case where the astral body AF has not been executed, determines a quantity of steps based on the environment when the reference position was measured at the time of manufacturing.

Note that in the present embodiment, the CPU 15 refers to a value that matches completely with respect to the focal distance among shooting environments, and determines the quantity of scanning points according to differences in the internal temperature and the elevation angle. The CPU 15 determines the quantity of scanning points to be five points in a case where the internal temperature and the elevation angle are both substantially the same, and determines the quantity of scanning points to be seven points in a case where the internal temperature is substantially the same and the elevation angle has a small difference. Also, in a case where the internal temperature is substantially the same and the elevation angle has a large difference, the CPU 15 determines the quantity of scanning points to be nine points or more according to the difference in the elevation angle.

Also, in a case where the difference in the internal temperature is small and the elevation angle is substantially the same, the CPU 15 determines the quantity of scanning points to be seven points, and in a case where the difference in the internal temperature is small and the elevation angle is not in a range that is substantially the same, the CPU 15 determines the quantity of scanning points to be nine points or more according to the difference in the elevation angle. Further, in a case where the difference in the internal temperature is large, the CPU 15 determines the quantity of scanning points to be nine points or more according to the difference in the elevation angle.

Here, the internal temperature is determined to be substantially the same in a case where the difference in the internal temperature is not more than 5° C., and is determined to have a small difference in a case where the difference in the internal temperature is more than 5° C. and not more than 10° C., and is determined to have a large difference in a case where the difference in the internal temperature is more than 10° C.

Also, the elevation angle is determined to be substantially the same in a case where the difference in the elevation angle is not more than 10 degrees, and is determined to have a small difference in a case where the difference in the elevation angle is more than 10 degrees and not more than 20 degrees, and is determined to have a large difference in a case where the difference in the elevation angle is more than 20 degrees.

However, these are only examples, and a determination may be made using another threshold value, and the number of classifications may be increased or reduced.

Regarding the same focal distance, in a case where reference positions corresponding to a plurality of combinations of internal temperatures and elevation angles have been recorded, first a search for the reference position having the nearest internal temperature is performed, and then the difference in the elevation angle is evaluated.

The reason for determining the quantity of scanning points in this way is so that an in-focus position can be reliably detected, while avoiding lengthening the time of the astral body AF.

After determining the quantity of scanning points as described above, the CPU 15 advances processing to step S505 and executes the scanning operation, thereby acquiring an AF evaluation value.

That is, the CPU 15 controls the focus drive motor 22 through the second motor drive circuit 19 to move the focus lens 3 to the scanning start position (position A in FIG. 4). Then, the CPU 15 moves the focus lens 3 in scanning intervals from the scanning start position to the scanning end position (position B in FIG. 4), executes shooting at each position, and with respect to the image obtained at each position, acquires the AF evaluation value output by the AF processing circuit 14.

In step S506, the CPU 15 uses a publicly-known arbitrary method to evaluate the reliability of the AF evaluation values that were obtained by the scanning operation, and if those values are determined to be reliable, the CPU 15 advances processing to step S507, and if those values are not determined to be reliable, the CPU 15 advances processing to step S510.

In step S507, the CPU 15 calculates the position of the focus lens 3 having the largest AF evaluation value (position C in FIG. 4) from the acquired AF evaluation values.

Because the position of the focus lens 3 is changed for each scanning interval, the largest value of the obtained AF evaluation values is not necessarily the true largest value. For example, in the example shown in FIG. 4, when AF evaluation values were acquired at positions a1, a2, and a3 of the focus lens 3 in the vicinity of the in-focus position, the AF evaluation value acquired at position a2 is the largest value, but the true largest value is obtained at position C. Accordingly, the CPU 15 calculates position C where the true largest value of the AF evaluation values is obtained, from the largest value of the acquired AF evaluation values, the AF evaluation values acquired before and after that largest value, and the positions of the focus lens 3 that were obtained with those AF evaluation values.

When a largest AF evaluation value Y1 was acquired with the focus lens 3 at position a2, and AF evaluation values Y2 and Y3 were acquired at positions a1 and a3 before and after position a2, the in-focus position C of the focus lens 3 can be calculated from the following formula:

$$C = \frac{(Y3-Y2) \cdot a2 + (Y3-Y1) \cdot a1 + (Y2-Y1) \cdot a3}{2 \cdot (Y3-Y1)}$$

wherein Y1>Y3, and Y1≥Y2.

After calculating the in-focus position of the focus lens 3, the CPU 15 compares the in-focus position to the reference position (step S508), and if the in-focus position is within a predetermined range from the reference position, the CPU 15 determines that the astral body AF was successful (determines that the results of the astral body AF are reliable). Then, the CPU 15 drives the focus lens 3 to the detected in-focus position (position C in FIG. 4) (step S509).

In step S508, the predetermined range can be set in advance in consideration of, for example, various tolerances (thermometer tolerance, attitude detection tolerance, or scanning AF tolerance) or changes with the passage of time that cause a difference between the reference position and the true in-focus position of the object (astral body), or reproducibility of shifts in the in-focus position in the same environment, or the like. Also, in consideration of effects when objects such as trees, shrubs, buildings, or the like exist in the foreground, the range on a near side of the reference position may be set smaller than the range on a far side.

For example, it is presumed that:
the thermometer tolerance is 2.5° C. (corresponding to the in-focus position being 1.5 times the focal depth at the open F value),
the attitude detection tolerance is five degrees (corresponding to the in-focus position being 2.5 times the focal depth at the open F value,
the scanning AF tolerance corresponds to 0.5 times the focal depth at the open F value,
the change with the passage of time corresponds to 1.5 times the focal depth at the open F value, and
reproducibility of focus distance shift in the same environment corresponds to 1.5 times the focal depth at the open F value. In this case, a root mean square (RMS) of each numerical value is calculated, and in consideration of a predetermined coefficient, the range on the far side can be set corresponding to 6 to 7 times the focal depth at the open F value. The range on the near side can be set to a range where blurring of the object is not noticeable, for example corresponding to 3 times the focal depth at the open F value. The predetermined range can be determined according to the focal distance.

When not determined in step S506 that the AF evaluation value is reliable, and when not determined in step S508 that the difference between the focus distance and the reference position is within the predetermined range, in step S510 the CPU 15, as in step S220, drives the focus lens 3 to the reference position (fixed point) of the astral body AF.

The operation described above is the scanning AF operation in the astral body AF mode.

Returning to FIG. 2, in step S209 the CPU 15 returns the drive mode of the image sensor 5 to the mode for live-view display, and also returns the display of the display apparatus 10 to display of a live-view image. Further, the CPU 15 informs the user of whether or not the astral body AF performed in step S208 was successful. For example, in a case where the astral body AF was successful, the CPU 15 lights the LED 29, and displays a green frame superimposed on the live-view image of the display apparatus 10. In a case where the astral body AF failed, the CPU 15 flashes the LED 29, and displays a yellow frame superimposed on the live-view image of the display apparatus 10.

Then, in step S210, the CPU 15 checks whether the SW 1 is switched on (whether the release button has been operated to a half-press), and if the SW 1 is switched on, the CPU 15 advances processing to step S211 and executes the astral body AE, and if the SW 1 is not switched on, the CPU 15 returns processing to step S201.

In step S211, the CPU 15 determines shooting conditions (a combination of the F value of the aperture 4, the accumulation time of the image sensor 5, and the amplification factor of the image capture circuit 6) for obtaining an image of proper exposure from the photometric values acquired in step S204. Unlike when performing AF, when shooting an image to be recorded, stars of first or second magnitude can be saturated in the image so that dark stars such as those of third to sixth magnitude can be recognized in the image. Therefore, shooting conditions are determined so as to result in proper exposure.

Note that when executing step S211, photometric values may be acquired from the AE processing circuit 13 and used, without using the photometric values acquired in step S204.

After executing the astral body AE, in step S212 the CPU 15 checks whether the SW 2 is switched on (whether the release button has been operated to a full-press), and if the SW 2 is switched on, the CPU 15 advances processing to step S213 and executes processing to generate (expose) an image for recording, and processing to record the image for recording. The processing to generate an image for recording and processing to record the image for recording are publicly known, so a description of that processing is omitted here. If the SW 2 has not been switched on, the CPU 15 returns processing to step S201. Note that the position of the focus lens 3 used in the processing of step S212 is the fixed point (step S220), the result of the astral body AF (step S208), the result of normal AF (step S230), or the result of astral body AF that was performed in the past within a predetermined time period from the present, in the same environment as the present.

After performing the shooting and recording processing, in step S214, the CPU 15 determines whether or not the astral body AF was executed, and if determined that the astral body AF was executed, the CPU 15 advances processing to step S215, and if determined that the astral body AF has not been executed (the normal AF was executed), the CPU 15 advances processing to step S201. Then, in step S215, the CPU 15 updates the reference position, and in step S216, the CPU 15 updates the focus correction amount. Note that the reference position and the focus correction amount do not necessarily need to be updated each time that shooting and recording processing accompanying the astral body AF are executed.

Updating of the reference position executed by the CPU 15 in step S215 will be described with reference to the flowchart in FIG. 6.

As described above, a reference position is measured with respect to some discrete focal distance at the time of manufacturing, or a reference position with respect to another focal distance is calculated through an interpolation calculation from the measured reference position, and for example, is recorded as shown in FIGS. 7A and 7B in the storage apparatus 25.

At the time of manufacturing, reference positions are recorded in a format described as 'reference positions at the time of manufacturing'. Reference positions are recorded that were measured with respect to a combination of some or all settable focal distances, and the internal temperature and the elevation angle in the environment at the time of manufacturing. Here, the reference position is presumed to be measured in an environment with an internal temperature of 20° C. and an elevation angle of 0 degrees. Note that in FIG. 7A, measurements regarding six focal distances have been performed, but this is only an example, and the quantity of focal distances is arbitrary.

In steps S601 and S602, the CPU 15 acquires information (the focal distance, the internal temperature, and the elevation angle) of the shooting environment when presently executing the astral body AF, and the focus distance that was detected in the present astral body AF.

In step S603, the CPU 15 refers to an area of the storage apparatus 25 where 'recorded/updated in-focus positions' (FIG. 7B) are recorded, and checks whether the astral body AF has been executed in the past in substantially the same environment as the present astral body AF. The CPU 15, for example, among the past instances of astral body AF for which the reference position was updated, determines that an astral body AF has been executed in substantially the same environment when the focal distance is the same as the present astral body AF, the difference in the internal temperature is 5° C. or less and the difference in the elevation angle is 10° or less.

When such an astral body AF has been executed, in step S604, the CPU 15 updates the shooting environment and the focus distance related to that astral body AF, which are stored in the storage apparatus 25, using the values for the present astral body AF. The updating may be performed by replacement with the present values, or may be performed by replacement with values obtained from the recorded values and the present values (for example, average values).

If the astral body AF has not been executed in the past in substantially the same environment as the present astral body AF, the CPU 15 advances processing to step S605, and adds the values related to the present astral body AF to the 'recorded/updated in-focus positions'.

Because the recording capacity of the 'recorded/updated in-focus positions' is restricted, when a maximum value has been reached, recording is performed by overwriting the oldest information. The oldest information is deleted, and a new value is recorded in that area. The reason for this is that the old information is less reliable than the latest information, and also the old information is used less frequently.

In step S606, the CPU 15 determines whether or not the reference position can be interpolated with respect to the focal distance. Specifically, the CPU 15 determines that the reference position can be interpolated with respect to the focal distance if the internal temperature and the elevation angle are substantially the same, and an astral body AF result (in-focus position) has been acquired at a plurality of focal distances (for example, focal distances at a wide-angle end and a telephoto end, and a middle focal distance) necessary for interpolation of the reference position.

When determined that interpolation is possible, in step S607, the CPU 15 performs interpolation and adds to the reference position table. Indexes 1 to 6 in FIG. 8 show an example where reference positions with an internal temperature of 20° C. and an elevation angle of 45 degrees were interpolated with respect to focal distance. The method of interpolation is not particularly limited, but using a set of the reference position and the focal distance used for interpolation as two-dimensional coordinates, it is possible, for example, to calculate a quadratic function by a quadratic Lagrange interpolating polynomial, and calculate a value of the quadratic function corresponding to the focal distance to be interpolated as the reference position.

In step S608, the CPU 15 determines whether or not the reference position can be interpolated with respect to the internal temperature. Specifically, the CPU 15 determines that the reference position can be interpolated with respect to the internal temperature if the focal distance and the elevation angle are the same, and a plurality of updated reference positions that have different internal temperatures exist. Accordingly, as shown in FIG. 8, if updated reference positions exist with respect to an elevation angle of 45 degrees and an internal temperature of 20° C. (Indexes 1 to 6), and an elevation angle of 45 degrees and an internal temperature of 10° C. (Indexes 7 to 12), the CPU 15 determines that the reference position can be interpolated with respect to internal temperatures of 10 to 20° C. The method of interpolation is not limited, but linear interpolation can be used, for example. Accordingly, an average value of the reference positions corresponding to internal temperatures of 10° C. and 20° C. can be interpolated as the reference position when the internal temperature is 15° C. (Indexes 13 to 18).

In step S610, the CPU 15 determines whether it is possible to interpolate in the direction of the elevation angle of the reference position. Specifically, the CPU 15 determines that it is possible to interpolate the reference position with respect to the elevation angle if the focal distance and the internal temperature are the same, and a plurality of updated reference positions that have different elevation angles exist. Accordingly, as shown in FIG. 8, if updated reference positions exist with respect to an elevation angle of 45 degrees and an internal temperature of 20° C. (Indexes 1 to 6), and an elevation angle of 75 degrees and an internal temperature of 20° C. (Indexes 19 to 24), the CPU 15 determines that the reference position can be interpolated with respect to elevation angles of 45 to 75 degrees. The method of interpolation is not limited, but linear interpolation can be used, for example. Accordingly, an average value of the reference positions corresponding to elevation angles of 45 degrees and 75 degrees can be interpolated as the reference position when the elevation angle is 60 degrees (Indexes 25 to 30).

By such processing, the CPU 15 updates the reference position.

Next, processing to update the focus correction value in step S215 will be described.

As described above, in the astral body AF, the AF evaluation values are calculated based on an image signal that is not modified by adding (or thinning) in the horizontal direction or the vertical direction. On the other hand, in the scanning AF (referred to below as normal AF) performed during normal shooting processing in step S230, in order to accelerate processing, the AF evaluation values are calculated from an image signal that has been modified by adding (or thinning) in the horizontal and vertical directions.

Note that in the shooting processing (processing to shoot an image for recording) executed when the SW 2 is detected to be on, the image signal is not modified by adding (or thinning) in the horizontal direction or the vertical direction.

In this way, the spatial frequency component is the same for the astral body AF and an image signal used for recording, but the spatial frequency component of an image signal used for the normal AF has fewer high frequency components than the spatial frequency component of the astral body AF and the image signal used for recording. Therefore, when executing the normal AF, the frequency band of a high frequency component to be extracted by a high-pass filter (HPF) used in the AF processing circuit 14 is set lower than when executing the astral body AF.

Therefore, there are cases where the position of the focus lens 3 at which the AF evaluation value becomes a peak value in the normal AF differs from the position of the focus lens 3 where an image to be recorded has the highest resolution. Therefore, when the normal AF was executed, the position (the in-focus position) of the focus lens 3 at which the AF evaluation value becomes a peak value is corrected.

The correction amount (focus correction amount) of the in-focus position, for example at the time of manufacturing, is measured for a plurality of combinations of the F value, the focal distance, and the focus lens position, and can be recorded in the storage apparatus 25 in a table format as shown in FIG. 9A. Thus, when performing shooting, it is possible to refer to the table and acquire a focus correction value that corresponds to the shooting conditions. Note that in the example shown in FIG. 9A, focus correction amounts are recorded with respect to combinations of an open F value, six focal distances, and four focus lens positions (ranges), but the quantity of combinations is merely an example.

Note that in a case where the aperture is not open when shooting, for example with an F value of F8.0 or more, the focus correction amount is set to 0, and for F values between the open F value and F8.0, corresponding correction amounts can be calculated through linear interpolation or the like.

Also, regarding the focus lens position, the movement range of the focus lens 3 is divided into four ranges, and the position of the focus lens 3 when shooting is included in any of these divided ranges. Accordingly, if the focal distance is the same, the same focus correction amount is used for a plurality of focus lens positions included in the same divided range.

On the other hand, there are cases where the focus correction amount does not result in an optimal value, due to changes with the passage of time, measurement tolerances at the time of manufacturing, interpolation calculation tolerances, or the like. Therefore, in the present embodiment, the focus correction amount is updated using the results of the astral body AF, and the updated focus correction amount is recorded. FIG. 8B shows an exemplary table of focus correction amounts that were updated using the astral body AF results.

Processing to update the focus correction amount will be described with reference to the flowchart in FIG. 10.

In steps S901 and S902, the CPU 15 acquires the shooting environment (at least the focal distance and the F value) when executing the astral body AF in step S208, and the result (focus lens position). Note that here, it is presumed that the astral body AF was successful (presumed that the in-focus position of the focus lens 3 is within the predetermined range from the reference position).

In step S903, the CPU 15 implements the normal AF with the same range and scanning points as the astral body AF, and calculates the in-focus position of the focus lens 3 in the normal AF based on the obtained AF evaluation values. As described above, in the normal AF, using an image signal modified by adding, AF evaluation values are calculated based on a high frequency component in a lower frequency band than in the astral body AF. In the astral body mode, shooting is commonly performed using a tripod, so here, the image to be shot in order to perform the normal AF is basically an image obtained by shooting the same scene as the scene shot by implementing the astral body AF, and an in-focus position is detected with respect to the same object as the astral body AF.

In step S904, the CPU 15 calculates the difference between the in-focus position that is the result of the astral body AF and the in-focus position that is the result of the normal AF in step S903, as the focus correction amount in the environment (the focal distance, the F value, and the focus lens position (range)) in which the astral body AF was executed.

Then, in step S905, the CPU 15 checks whether or not recording/updating of the focus correction amount with respect to substantially the same shooting environment (the focal distance, the F value, and the focus lens position (range)) was performed in the past. This can be executed by, for example, referring to the recording area 'recorded/updated focus correction amounts' of the storage apparatus 25, shown in FIG. 9B. Note that here, a focus correction amount obtained by converting the aperture value to the open F value is recorded, but a configuration may also be adopted in which a focus correction amount without aperture value conversion and an aperture value are recorded.

When recording/updating of the corresponding focus correction amount has been executed, in step S906, the CPU 15 updates information of the corresponding focus correction amount, which is recorded in the storage apparatus 25, using the correction amount calculated in step S904. The updating may be performed by replacement with the present values, or may be performed by replacement with values obtained from the recorded values and the present values (for example, average values).

If recording/updating of the corresponding focus correction amount has not been executed, the CPU 15 advances processing to step S907, and adds the presently calculated correction amount to the 'recorded/updated focus correction amounts'.

In step S908, the CPU 15 determines whether or not it is possible to interpolate the focus correction amount with respect to the focal distance. The CPU 15, for example, determines that it is possible to interpolate the focus correction amount with respect to the focal distance if the aperture value and the focus lens position (range) are the same, and astral body AF results have been acquired at a plurality of focal distances (for example, focal distances at a wide-angle end and a telephoto end, and a middle focal distance) necessary for interpolation of the focus correction amount.

When interpolation is possible, in step S908, the CPU 15 interpolates the focus correction amount with respect to the focal distance, and creates a table of focus correction amounts at the focus lens positions as shown by Indexes 1 to 6 in FIG. 8.

When determined that interpolation is possible, the CPU 15 performs interpolation in step S909, and adds to the table of focus correction amounts. Index 4 in FIG. 9B shows an example in which, using Indexes 1 to 3, the focus correction amount at the open F value and a focus lens position (range) of infinity was interpolated with respect to a focal distance 'Middle 1'. The method of interpolation is not particularly limited, but using a set of the focus correction amount and the focal distance used for interpolation as two-dimensional coordinates, it is possible, for example, to calculate a quadratic function by a quadratic Lagrange interpolating polynomial, and calculate a value of the quadratic function corresponding to the focal distance to be interpolated as the focus correction amount.

In this way, the automatic focal adjustment apparatus of the present embodiment has an operation mode targeted at an object positioned at infinity and having low illuminance. Also, based on whether or not the in-focus position of the focus lens, which was detected based on the AF evaluation values obtained from the captured image, is within the predetermined range from the position of the focus lens corresponding to the hyperfocal distance, stored in advance, a determination of whether or not the detected in-focus position is reliable is performed. Therefore, it is possible to confirm that the result of automatic focal adjustment is actually a focus distance appropriate for an object positioned at infinity.

Further, when not determined that the detected in-focus position is reliable, by moving the focus lens to the position (the reference position) corresponding to the hyperfocal distance stored in advance, it is possible to reliably focus the imaging optical system on an object positioned at infinity.

Further, it is possible to configure the predetermined range for determining reliability of the detected in-focus position from a range on the far side from the reference position and a range on the near side, and set the range on the near side smaller than the range on the far side. In this case, it is possible to suppress mistakenly determining that a state focused on the foreground is a reliable result of automatic focal adjustment.

Also, the position (the reference position) of the focus lens corresponding to the hyperfocal distance changes according to the attitude of the image capture apparatus, the internal temperature of the imaging optical system, changes with the passage of time, and the like. Therefore, by adopting a configuration in which the reference position that was measured at the time of manufacturing is updated or revised based on an in-focus position that was actually detected, it is possible to improve the accuracy of the reference position, and as a result it is possible to improve the accuracy of determining reliability of the automatic focal adjustment.

Further, a correction amount of the in-focus position, used in a case where spatial frequency components differ between an image signal to be recorded and an image signal that generates an AF evaluation value, can be corrected based on the in-focus position that was detected in the operation mode targeted at an object positioned at infinity and having low illuminance. By doing so, it is possible to reduce the effects of changes with the passage of time since the time when the correction amount was measured, or calculation tolerances when measurement was performed, thereby improving the accuracy of the in-focus position. Therefore, when generating an AF evaluation value using an image signal that has been modified by adding or thinning in order to accelerate the AF operation in an operation targeted at an ordinary object, it is possible to increase the accuracy of focal detection.

Second Embodiment

Next, a second embodiment of the present invention will be described. In the present embodiment, a reference position to be used when shooting is calculated from a reference position that was measured and recorded at the time of manufacturing. The present embodiment is the same as the first embodiment, except for the scanning AF processing in step S208 and the processing to update the reference position in step S215, so below, the scanning AF processing and the processing to update the reference position will be described.

The scanning AF processing in the present embodiment will be described with reference to the flowchart in FIG. 5. The processing in steps S501 and S502 is the same as in the first embodiment.

In step S503, the CPU 15 acquires information related to the shooting environment when the reference position was measured (for example, in the example in FIG. 7A, the internal temperature is 20° C. and the elevation angle is 0 degrees), and information related to the present shooting environment.

Then, the CPU 15 calculates the reference position when performing shooting according to the below formula, from the reference position that was measured and recorded at the time of manufacturing, and conversion coefficients according to the difference in the environment between the time of manufacturing and the time of shooting.

Reference position=reference position at the time of manufacturing+internal temperature conversion coefficient×(internal temperature when shooting−internal temperature at the time of manufacturing)+elevation angle conversion coefficient×(elevation angle when shooting−elevation angle at the time of manufacturing) However, a positive value is used for the elevation angle, and in the case of a negative value, 0 degrees is used as the elevation angle. The internal temperature also is provided with an upper limit (for example, 40° C.) and a lower limit (0° C.), and when exceeding the upper limit, the maximum value is used, and when dropping below the lower limit, the minimum value is used.

Regarding the conversion coefficients for the internal temperature and the elevation angle, respective values for each of a plurality of focal distances can experimentally be determined in advance and recorded in the storage apparatus 25 at the time of manufacturing. Also, the conversion coefficients can be updated each time that the astral body AF is performed, for example.

Also, when the astral body AF has been executed, the CPU 15 calculates the internal temperature conversion coefficient and the elevation angle conversion coefficient using the environment and the in-focus position when executing the astral body AF, recorded in the format shown in FIG. 7B.

For example, with respect to a specific focal distance, when the astral body AF has been performed in an environment in which the elevation angle is the same and the internal temperature is different (in a range from the minimum value to the maximum value), the internal temperature conversion coefficient at that focal distance is calculated, and added or updated.

Likewise, for a specific focal distance, when the astral body AF has been performed with an environment in which the internal temperature is the same and the elevation angle is different (in a range from the minimum value to the maximum value), the elevation angle conversion coefficient at that focal distance is calculated, and added or updated.

The calculation and addition or updating of the internal temperature conversion coefficient and the elevation angle conversion coefficient can be executed each time an astral body AF that satisfies conditions is performed.

Then, the CPU 15 determines a quantity of scanning points based on the reliability of the conversion coefficients, specifically, based on a degree of updating (step S504). When an astral body AF has not yet been performed, the CPU 15 sets the quantity of scanning points to nine points as an initial value, for example. In a case where only one of the conversion coefficients has been updated, the CPU 15 reduces the quantity of scanning points by one from the initial value, setting the quantity of scanning points to eight points.

Also, when the conversion coefficients of both the internal temperature and the elevation angle have been updated, the CPU 15 reduces the quantity of scanning points by two from the initial value, setting the quantity of scanning points to seven points.

Also, when the conversion coefficients of both the internal temperature and the elevation angle have been updated, and one of the conversion coefficients has been updated a plurality of times, the CPU 15 reduces the quantity of scanning points by three from the initial value, setting the quantity of scanning points to six points.

When the conversion coefficients of both the internal temperature and the elevation angle have been updated a plurality of times, the CPU 15 reduces the quantity of scanning points by four from the initial value, setting the quantity of scanning points to five points.

After determining the quantity of scanning points, from step S505 onward, similar processing as in the first embodiment is performed.

Also, updating of the reference position in step S215 is performed as follows.

Along with updating the in-focus position detected in the astral body AF so as to serve as the reference position to be used in the astral body AF performed in the same environment next time, the sizes of the ranges on the near side and the far side of the predetermined range used in determining reliability of the in-focus position in step S508 are changed according to the near-far relationship of the in-focus position and the reference position.

Specifically, when the in-focus position is on the far side from the reference position, the CPU 15 sets a small range for the near side of the predetermined range. When the in-focus position is on the far side from the reference position, this means that the results of measurement at the time of manufacturing are offset to the near side, and indicates a high probability of mistakenly focusing on an object or the like on the near side. Therefore, by further reducing the size of the range of the near side within the predetermined range, it is possible to suppress mistakenly focusing on an object or the like on the near side. The CPU 15 can set the range of the near side to correspond to two times the focal depth at the open F value, for example.

Conversely, when the in-focus position is on the near side from the reference position, the CPU 15 sets a small range for the far side of the predetermined range. When the in-focus position is on the near side from the reference position, this means that the results of measurement at the time of manufacturing are offset to the far side, and in this case, it is conceivable that there is a low probability of mistakenly focusing on an object or the like on the near side, so it is not necessary to change the range of the near side. On the other hand, by reducing the size of the range of the far side, it is possible to suppress false focusing due to the effects of noise or the like. The CPU 15 can set the range of the far side to correspond to four to five times the focal depth at the open F value, for example.

Further, the CPU 15 can update the internal temperature conversion coefficient and the elevation angle conversion coefficient by interpolation. The new conversion coefficient to be used can by calculated from the conversion coefficient for the internal temperature or the elevation angle used in astral body AF that has already been performed, by performing linear interpolation using a least squares method, for example.

According to the present embodiment as well, similar effects as the first embodiment can be realized.

Other Embodiments

In the above-described embodiments, the focus correction amount is a value corresponding to a combination of the focus lens position (range) and the focal distance, but the combination may further include the internal temperature.

Also, it is not absolutely necessary to update the reference position, and a value measured in conditions close to the shooting environment, or a value interpolated from a value measured in conditions close to the shooting environment, may also be used.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-201542, filed on Oct. 9, 2015, which is hereby incorporated by reference herein in its entirety.

What is claimed is:

1. An automatic focal adjustment apparatus, comprising:
    a generating unit configured to generate an AF evaluation value from an image signal;
    a detecting unit configured to detect an in-focus position of a focus lens based on the AF evaluation value; and
    a control unit configured to move the focus lens to the detected in-focus position when the detected in-focus position is within a predetermined range from a reference position that is determined in advance corresponding to an object at an infinity distance, and move the focus lens to a predetermined position when the detected in-focus position is not within the predetermined range from the reference position,
    wherein the predetermined position is the reference position, or is an in-focus position within the predetermined range from the reference position from among in-focus positions detected in the past by the detecting unit.

2. The automatic focal adjustment apparatus according to claim 1,
    wherein the predetermined range comprises a range on a near side and a range on a far side with reference to the reference position, and the range on the near side is smaller than the range on the far side.

3. The automatic focal adjustment apparatus according to claim 1,
    wherein the reference position differs according to an environment when the image signal was obtained.

4. The automatic focal adjustment apparatus according to claim 3,
    wherein the environment is defined by a combination of a plurality of parameters including a focal distance of an imaging optical system, an internal temperature of a barrel of the imaging optical system, and an elevation angle of an image capture apparatus by which the image signal was obtained.

5. The automatic focal adjustment apparatus according to claim 1, further comprising an updating unit configured to update the reference position using the detected in-focus position.

6. The automatic focal adjustment apparatus according to claim 5, wherein the updating unit, when a reference position corresponding to the environment when the image signal was obtained does not exist, records the detected in-focus position as a reference position corresponding to the environment when the image signal was obtained.

7. The automatic focal adjustment apparatus according to claim 5, wherein the updating unit, using the detected in-focus position, further calculates and records a reference position corresponding to an environment different from the environment when the image signal was obtained.

8. The automatic focal adjustment apparatus according to claim 1, further comprising a calculating unit configured to calculate the reference position corresponding to the environment when the image signal was obtained by converting a reference position measured with a different environment than the environment when the image signal was obtained.

9. The automatic focal adjustment apparatus according to claim 8, further comprising an updating unit configured to update, using the detected in-focus position, a conversion coefficient used in order to convert the reference position.

10. The automatic focal adjustment apparatus according to claim 1, wherein the control unit, when the automatic focal adjustment apparatus is operating in an operation mode for shooting an object at a infinity distance, moves the focus lens according to a relationship between the detected in-focus position and the reference position.

11. The automatic focal adjustment apparatus according to claim 10, wherein there are more of a high frequency component included in the image signal in a case where the automatic focal adjustment apparatus is operating in the operation mode for shooting an object at a infinity distance than in a case where the automatic focal adjustment apparatus is operating in an operation mode for shooting an ordinary object.

12. The automatic focal adjustment apparatus according to claim 11, wherein a difference between the in-focus position detected by the detecting unit in the operation mode for shooting an object at a infinity distance and the in-focus position detected by the detecting unit in the operation mode for shooting an ordinary object is recorded as a correction amount of the in-focus position detected by the detecting unit in the operation mode for shooting an ordinary object.

13. An image capture apparatus, comprising:
an image sensor;
a circuit that generates an image signal from the image sensor; and
an automatic focal adjustment apparatus,
wherein the automatic focal adjustment apparatus comprising:
a generating unit configured to generate an AF evaluation value from an image signal;
a detecting unit configured to detect an in-focus position of a focus lens based on the AF evaluation value; and
a control unit configured to move the focus lens to the detected in-focus position when the detected in-focus position is within a predetermined range from a reference position that is determined in advance corresponding to an object at an infinity distance, and move the focus lens to a predetermined position when the detected in-focus position is not within the predetermined range from the reference position,
wherein the predetermined position is the reference position, or is an in-focus position within the predetermined range from the reference position from among in-focus positions detected in the past by the detecting unit.

14. A method of controlling an automatic focal adjustment apparatus, comprising:
generating an AF evaluation value from an image signal;
detecting an in-focus position of a focus lens based on the AF evaluation value;
moving the focus lens to the detected in-focus position when the detected in-focus position is within a predetermined range from a reference position that is determined in advance corresponding to an object at a infinity distance; and
moving the focus lens to a predetermined position when the detected in-focus position is not within the predetermined range from the reference position,
wherein the predetermined position is the reference position, or is an in-focus position within the predetermined range from the reference position from among in-focus positions detected in the past by the detecting unit.

15. A non-transitory computer-readable storage medium storing a computer program for causing a computer provided in an automatic focal adjustment apparatus to function as:
a generating unit configured to generate an AF evaluation value from an image signal;
a detecting unit configured to detect an in-focus position of a focus lens based on the AF evaluation value; and
a control unit configured to move the focus lens to the detected in-focus position when the detected in-focus position is within a predetermined range from a reference position that is determined in advance corresponding to an object at an infinity distance, and move the focus lens to a predetermined position when the detected in-focus position is not within the predetermined range from the reference position,
wherein the predetermined position is the reference position, or is an in-focus position within the predetermined range from the reference position from among in-focus positions detected in the past by the detecting unit.

* * * * *